United States Patent

[11] 3,580,310

| [72] | Inventors | Edward V. Frankenberg;<br>Norman N. Griffith, Jacksonville, Fla. |
|---|---|---|
| [21] | Appl. No. | 866,951 |
| [22] | Filed | Oct. 16, 1969<br>Division of Ser. No. 727,853, May 9, 1968 |
| [45] | Patented | May 25, 1971 |
| [73] | Assignee | Fleco Corporation<br>Jacksonville, Fla. |

[54] TREE-SHEAR DEVICE WITH BLADE
3 Claims, 7 Drawing Figs.
[52] U.S. Cl. .................................................. 144/34,
83/607, 83/658, 144/3
[51] Int. Cl. .................................................. A01g 23/02
[50] Field of Search .......................................... 144/2 (21),
3 (4), 34, 34 (1—5), 309 (34); 83/607, 608, 609,
658, 700

[56] References Cited
UNITED STATES PATENTS
3,482,614   12/1969   Jordan et al. .................   144/34
FOREIGN PATENTS
1,313,995   11/1962   France .........................   83/607

*Primary Examiner*—Gerald A. Dost
*Attorneys*—George H. Baldwin and Arthur G. Yeager ABSTRACT: An improved tree-shear device having a pivotally mounted cutting blade powered by a cylinder and piston on which the rearward edge of the cutting blade is of a predetermined configuration to minimize the space between such rearward edge and the cylinder and piston disposed adjacent thereto during movement of the blade during its entire travel between its open and closed positions.

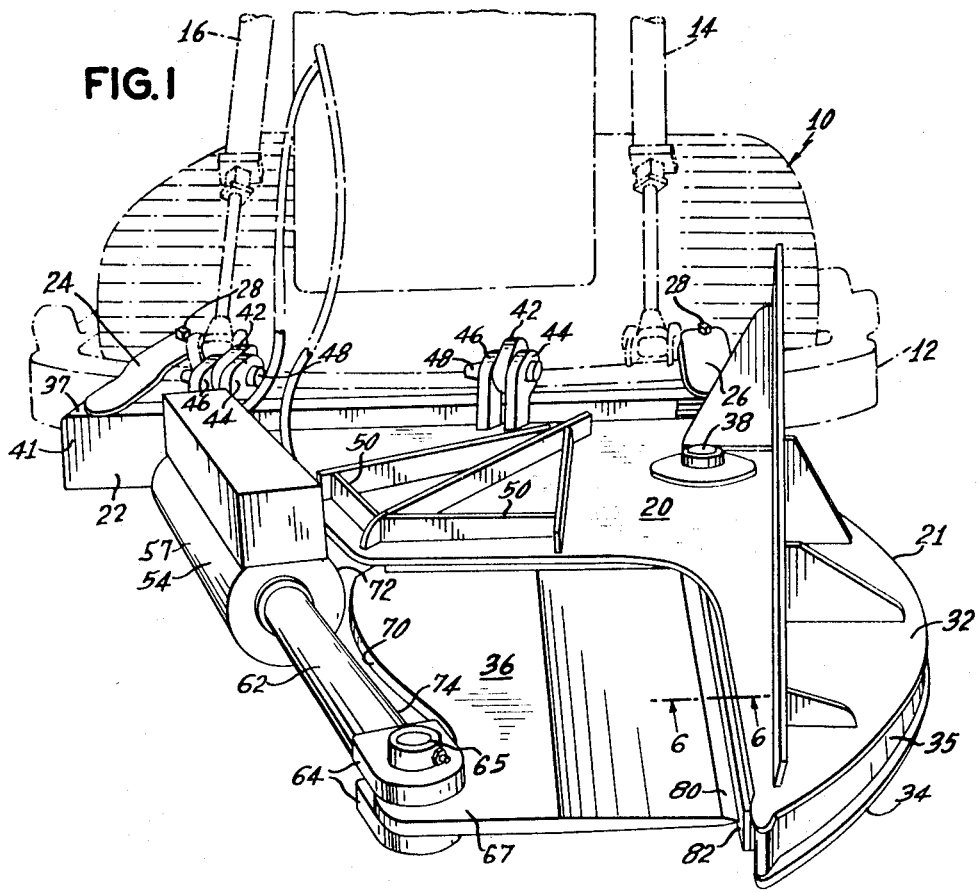
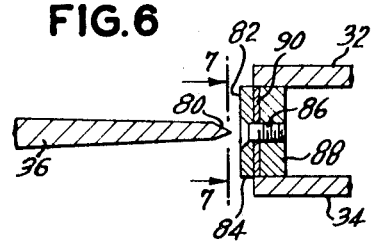
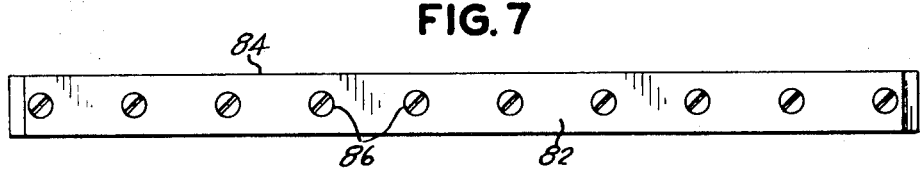
INVENTORS
Edward V. Frankenberg
Norman N. Griffith
BY
George H. Baldwin
ATTORNEY

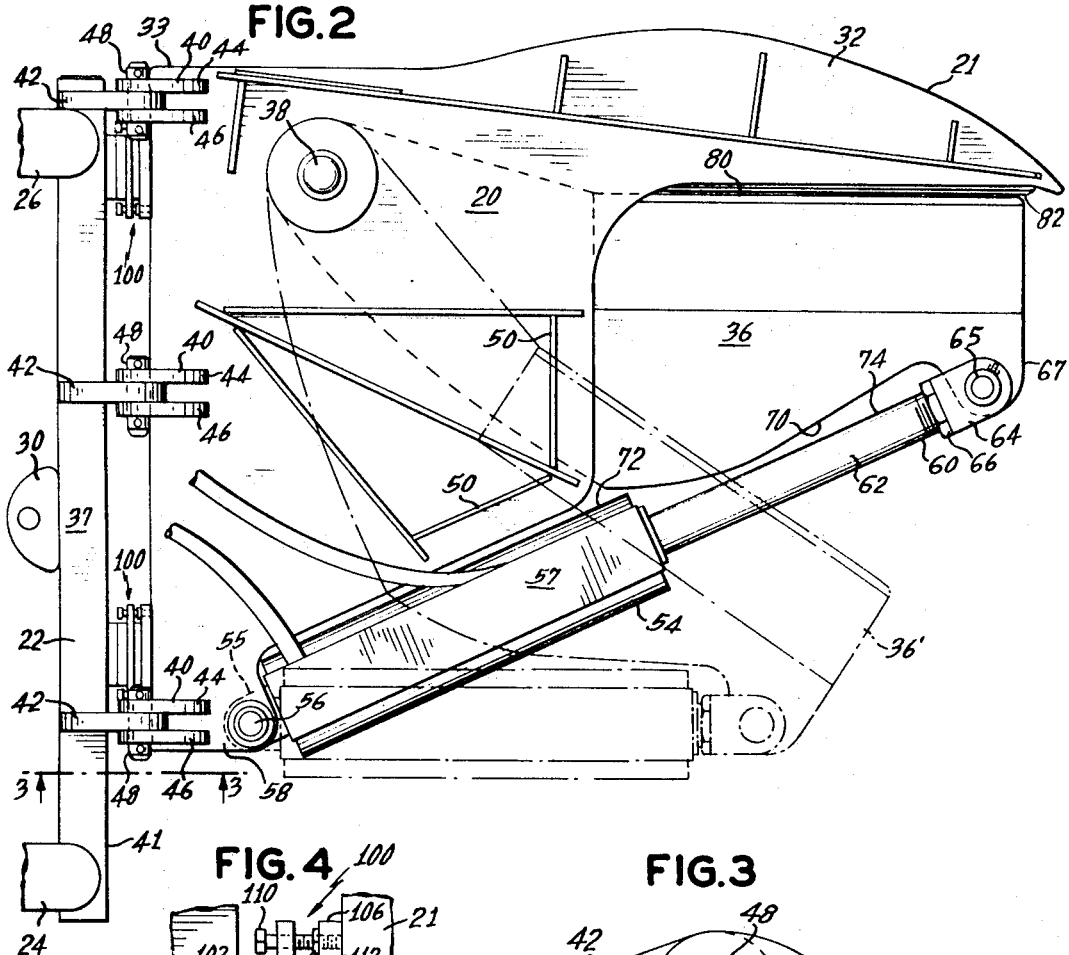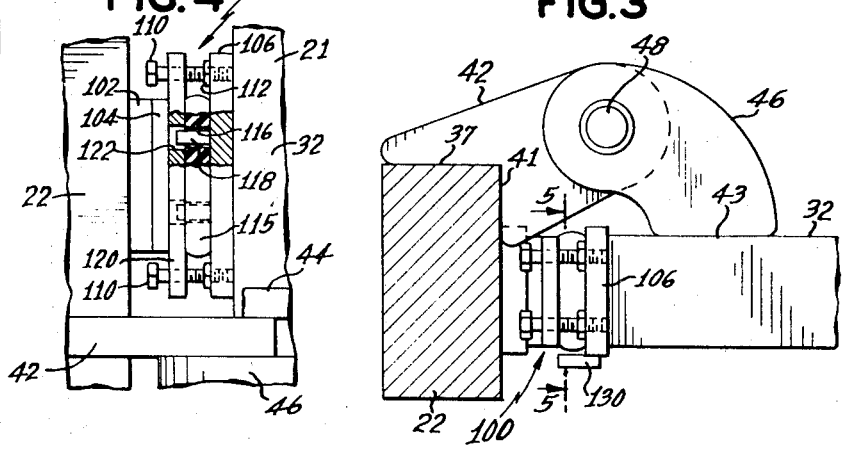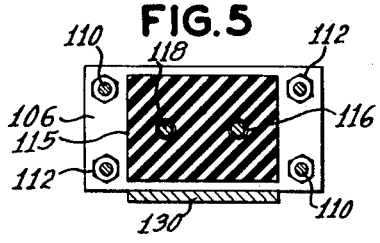

TREE-SHEAR DEVICE WITH BLADE

CROSS-REFERENCE TO RELATED APPLICATION

This application is a division of application Ser. No. 727,853 filed May 9, 1968, entitled Tree Shear Assembly.

BACKGROUND OF THE INVENTION

1. Field of the Invention

This invention relates to a tree-shear device with blade and more particularly to a device for attachment to a tractor for severing and felling trees and the like.

2. Description of the Prior Art

There have been many tree felling devices available on the market and many such devices were patented. Among the various prior art patents relating to tree shear devices are the following U.S. Pat. Nos.: 2,214,334; 2,565,252; 3,196,911; 3,270,787 and 3,327,745. In some of the prior art devices various components attached to the shear head would permit small trees and brush to become lodged between such components as the tractor and shear head traveled about within the forests. Often these components would become bent or broken requiring repair or replacement before such shear head would again be satisfactorily operable. Also, the large space between the rearward edge of the blade and the operating cylinder and piston (see U.S. Pat. Nos. 3,196,911 and 3,327,745) permitted trees, large limbs and stumps to enter such spaces while the blade is in open position and damage would occur to the cylinder and piston when the blade was being closed. Furthermore, some of the prior art devices did not withstand shock loads or impact loads imposed on the shear head during positioning, operation, or movement of the shear head through the forest.

SUMMARY

The tree-shear device in accord with this invention includes a shear head pivotally mounted to a frame with the blade cutting edge adapted to sever a tree between the cutting edge and the jaw means. The rearward edge of the blade generally opposite to the cutting edge is of a predetermined configuration and shape to minimize the space between such rearward edge and the power means, in the form of a cylinder and piston, disposed adjacent thereto which powers the cutting blade during its entire travel between its open and closed positions and during movement about in the forest and the like.

A general object of this invention is to provide an improved tree-shear device with blade for felling trees and the like.

A specific object of this invention is to provide an improved shear head having a pivotally mounted blade in which the space between the shear blade and the power means for moving same is minimized to prevent large limbs and the like from becoming lodged therein and damaging the power means.

Other objects of this invention include providing a tree shear device with blade rugged and durable in construction, economically manufactured and maintained and easily operable by the driver of the tractor.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 1 is a front perspective view of the tree-shear device with blade in accord with the invention mounted on the front end of a tractor, the tractor being shown by broken lines;

FIG. 2 is a plan view of the tree-shear device with blade with the open-blade position shown by broken lines;

FIG. 3 is an enlarged cross-sectional view taken along lines 3–3 of FIG. 2;

FIG. 4 is an enlarged plan view of a portion of the assembly of FIG. 2 with parts broken away for clarity;

FIG. 5 is a cross-sectional view taken along lines 5–5 of FIG. 3;

FIG. 6 is an enlarged cross-sectional view taken along line 6–6 of FIG. 1; and

FIG. 7 is an elevational view taken along line 7–7 of FIG. 6.

DESCRIPTION OF THE PREFERRED EMBODIMENT

Referring now to the drawings and particularly FIG. 1, the conventional tractor is designated by broken lines 10 which includes a framing member in the form of a standard C-frame 12 raisable and lowerable by a pair of oppositely disposed hydraulic cylinder assemblies 14 and 16 connected to and positioned on respective opposite sides of the tractor 10 in a manner well known in the art.

The shear assembly 20, in accord with the invention, includes an elongated beam or member 22 extending generally forwardly of and along tractor 10, and member 22 is connected to C-frame 12 by two rearwardly extending pairs of arms, including arms 24 and 26, welded to member 22, which extend above and below frame 12 with bolt connections 28 securing rearward arm ends of respective pairs of arms together. A pair of spaced ears, including ear 30, are welded to and extend rearwardly of member 22 for releasable connection to a portion (not shown) of C-frame 12 generally medially thereof, ear 30 only being shown in FIG. 2.

A pair of generally parallel and spaced plates 32 and 34, with blade 36 positioned therebetween, are disposed forwardly of member 22. Plates 32 and 34 are maintained in proper spaced position by a plurality of spacers, including spacer 35, welded therebetween. A pivotal connection 38 mounts blade 36 between plates 32 and 34 for restricted pivotal motion between its fully closed position and its fully open position 36'. Pivotal connections 40 are spaced along member 22 and connect member 22 with the rearward end portion 33 of the upper plate 32. Each connection 40 includes an upwardly extending ear 42 welded to the upper horizontal surface means 37 and upright surface means 41 of member 22 and a pair of upwardly extending and spaced ears 44 and 46 welded to the upper surface means 43 of plate 32 with a pin means 48 connecting adjacent upper ends of ears 42, 44 and 46.

The blade 36 rides between plates 32 and 34 on suitable bearing members (not shown) disposed generally along and beneath plate-reinforcing members 50, such bearing members being disposed on the inward surfaces of plates 32 and 34 and generally oppositely facing each other. Power means in the form of a hydraulic cylinder and piston 54 at its rearward end 55 is positioned between a portion 58 of each of plates 32 and 34 and a vertical pivot pin 56 connects end 55 thereto. As seen in FIG. 2, pin 56 is disposed generally opposite to the pivotal connection 38 of blade 36 and permits cylinder 57 to pivot about pin 56 as cylinder 57 moves blade 36 between its open and closed positions. The forward end 60 of piston rod 62 is internally threaded and an externally threaded portion (not shown) of clevis 64 is connected therewithin, a locknut 66 being provided about the clevis externally threaded portion to partially adjust and releasably fix the limit of the blade travel with respect to the anvil 82. The clevis 64 is connected by a vertical pivot pin 65 to the forward portion 67 of blade 36.

The blade 36 in accord with this invention is preferably designed to have a rear edge portion, that edge portion 70 generally opposite to cutting edge 80 and exposed from between plates 32 and 34, so that during the blade travel, from the fully open broken line position 36' in FIG. 2 to its fully closed full line position shown in FIGS. 1 and 2, the rear edge portion 70 will barely be out of contact with the inwardly disposed edge 72 of cylinder 57 and/or edge 74 of piston rod 62. The spacing between the rod edge 74 and cylinder edge 72 and the blade rear edge 70 is minimized throughout the movement of the blade 36 so that limbs and/or brush or the like of limited size only can work into or fall into such spacing. Any large limbs or brush are inhibited from entry into such spacing thereby affording protection to the cylinder 54 and rod 62 and minimizing damage thereto otherwise resulting when larger limbs or the like are caught in such spacing. In other words, if the spacing were not minimized, large limbs could become lodged in such spacing, and when cylinder 54 was activated, rod 62 may be bent or broken and/or other damage could be caused to the cylinder 54 or other components. Also, such large limbs would probably prevent the full travel of the blade cutting edge 80 from cutting through the tree trunk disposed between cutting edge 80 and jaw means in the form of anvil 82.

The anvil 82 in accord with another aspect of the invention comprises an elongated bar 84 removably connected by spaced fasteners in the form of screws 86 to an upright frame member 88 welded to and between plates 32 and 34. A shim 90 is located between bar 84 and member 88 which may be removed and replaced by a thicker and/or wedge-shaped shim when the blade edge 80 is sharpened after wear thereof. Also, the entire blade edge 80 need not require sharpening thus permitting partial shims to be placed between bar 84 and member 88 to compensate for the sharpening of only a portion of the blade edge 80. In this connection, the blade edge 80 will be normally sharpened along a generally straight line so that after proper shimming of the anvil bar 84, the bar 84 will meet the sharpened edge 80 of the blade 36. Preferably, the blade is sharpened uniformly requiring a uniform thicker shim to close the gap between blade edge 80 and anvil 82. The adjustable clevis 64 and rod 62 also may be used to partially close the gap between blade 36 and the anvil 82 after sharpening of the blade, but the adjustment in this manner may require more of the blade to be ground adjacent the heel of the anvil, this requiring a greater degree of skill and care in sharpening the blade.

According to the invention yieldable stop means 100 are provided between framing member 22 and the ends of plates 32 and 34 beneath the horizontal pivotal axis for the shear head 21 of assembly 20, such axis being provided by aligned pin means 48 in each pivotal connection 40 whereby shear head 21 may be lifted from its generally horizontal, tree-cutting, operative position shown in FIGS. 1 and 2 to a generally vertical, traveling, and inoperative position (not shown). The shear head 21 may be raised and lowered by a common cable and winch normally provided on the tractor 10.

The shear head assembly, as shown in the drawings, is either in cutting position on a downward slope or out of contact with the ground. When in use the shear head 21 may assume a tree-cutting position which is horizontal with the tractor similarly being horizontal, or which is inclined upwardly or downwardly with respect to the horizontal. In other words, the tree-shear assembly can be used for cutting trees on flat land, rolling terrain and on the slopes of hills over which a tractor can be adequately maneuvered. In the normal tree-cutting positions the stop means are not in operative contact unless the shear head is out of engagement with the ground or the shear head is positioned on a downward slope with respect to the tractor.

The components of the yieldable stop means 100 may best be understood by reference to FIGS. 3, 4 and 5 in which a pair of generally rectangular plates 102 and 104 are suitably welded together and to the upright surface means 41 of member 22. Oppositely facing plates 102 and 104 is a generally rectangular plate 106 welded to each of the end edges of parallel plates 32 and 34, such end edges forming an upright surface means opposite to and generally parallel with the upright surface means 41 of member 22. A plurality of threaded bolts 110 and adjustably connected to plate 106 and extend rearwardly toward tractor 10 and plates 102 and 104. A lock nut 112 is threaded onto each bolt 110 for adjustaBly affixing the rearward extent of bolt 110. Juxtaposed with respect to plate 106, opposite to its connection with the ends of parallel plates 32 and 34, is a yieldable and resilient rectangular member 115 made of rubber or the like, member 115 being maintained in juxtaposition by rearwardly extending lugs 118 attached to plate 106 and passing through a pair of spaced openings 116 to member 115. A plate 120 is slidingly disposed on bolts 110 and is juxtaposed with respect to member 115 opposite to plate 106. Plate 120 includes a pair of openings 122 therethrough aligned with lugs 118, so that when member 115 is substantially compressed between plates 106 and 120, the lugs 118 may move into openings 122 as shown in FIG. 4. Lugs 118 function to retain member 115 properly disposed between plates 106 and 120 when there is a lack of any compressive force, as when the shear head 21 is in its upstanding traveling position. Affixing member 115 to plate 106 by gluing or the like is undesirable since the forces imposed on member 115 would have a tendency to tear and/or otherwise become damaged and would not be readily replaceable. A flat bar 130 is welded to plate 106 and extends rearwardly beneath rubber member 115 to protect same from brush or other obstructions which may damage same during use of the tree shear or during travel of the shear head in an upstanding manner.

While only a certain preferred embodiment of this invention has been shown and described by way of illustration, many modifications will occur to those skilled in the art and it is intended that all such modifications be included within the true spirit and scope of this invention.

What I claim as new and what it is desired to secure by Letters Patent of the United States is:

1. In a tree shear for attachment to a tractor comprising a shear head including a generally horizontal cutting blade having an elongated cutting edge, a frame including an elongated jaw means spaced from and extending generally parallel to said cutting edge, pivotal means for connecting said cutting blade to said frame generally longitudinally aligned with said jaw means, an elongated hydraulic cylinder and piston, means for pivotally attaching said cylinder to said frame generally laterally of said pivotal means, means for pivotally attaching said piston to said blade adjacent the outer free edge portion thereof and remote from said cutting edge for moving said blade from its open position providing an open tree-receiving space between said cutting edge and said jaw means to a closed position with said cutting edge closely adjacent to and extending along said jaw means, said cutting blade having an elongated rearward edge disposed generally opposite to and spaced from said cutting edge, said rearward edge being closely adjacent to, and extending along said cylinder when said piston is retracted within said cylinder and said blade is in its said open position, said rearward blade edge with said piston extended being closely adjacent to and extending along said piston when said blade is in its said closed position, said rearward edge having a predetermined and irregular configuration with the spacing between said rearward edge and cylinder and piston being substantially minimized for movement of said blade between its said open and closed positions thereby inhibiting large limbs and the like from entering in the space between said cylinder and piston and said rearward edge.

2. In the tree shear as defined in claim 1 wherein said blade width as measured perpendicularly from said cutting edge between said cutting edge and rearward edge is a predetermined minimum width adjacent the connection of said piston to said blade, said blade width being larger from adjacent said connection to a location spaced generally between said connection and said means for pivotally connecting said cutting blade to said frame and generally opposite to the effective cutting edge of said blade.

3. In the tree shear as defined in claim 1 wherein said frame includes an elongated portion extending along and positioned closely adjacent said cylinder when said cylinder has moved said blade to its closed position whereby the space therebetween is minimized to inhibit large limbs and the like from entering such space during movement of said blade, said rearward edge of said blade effectively closing the space between said frame portion and cylinder when said blade is in its open position.